US008841797B2

(12) United States Patent
Wischstadt et al.

(10) Patent No.: US 8,841,797 B2
(45) Date of Patent: Sep. 23, 2014

(54) WIRELESS ANNUNCIATOR FOR AN ELECTRICAL GENERATOR

(75) Inventors: Greg Wischstadt, Wales, WI (US); Steven Wilcox, Delafield, WI (US); David Vicari, Lake Geneva, WI (US); Jake Thomas, Eagle, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 689 days.

(21) Appl. No.: 13/008,632

(22) Filed: Jan. 18, 2011

(65) Prior Publication Data

US 2011/0254370 A1     Oct. 20, 2011

Related U.S. Application Data

(60) Provisional application No. 61/295,964, filed on Jan. 18, 2010.

(51) Int. Cl.
  *H02J 9/00* (2006.01)
  *G05B 15/02* (2006.01)
  *H02J 3/14* (2006.01)
  *H02J 9/08* (2006.01)

(52) U.S. Cl.
  CPC . *H02J 9/08* (2013.01); *G05B 15/02* (2013.01); *Y02B 70/3241* (2013.01); *Y04S 20/227* (2013.01); *H02J 3/14* (2013.01); *H02J 2003/143* (2013.01); *Y04S 20/222* (2013.01); *Y04S 20/248* (2013.01); *G05B 2219/2642* (2013.01); *Y04S 20/242* (2013.01); *Y02B 70/3225* (2013.01); *Y02B 70/3266* (2013.01); *Y02B 70/3291* (2013.01)
  USPC .......................................................... 307/64

(58) Field of Classification Search
  USPC ...................................................... 307/39, 64
  See application file for complete search history.

(56) References Cited

U.S. PATENT DOCUMENTS 5,332,927 A * 7/1994 Paul et al. ...................... 307/66
617,243 A     1/2001 Schackenberg et al.
(Continued)

FOREIGN PATENT DOCUMENTS

| JP | 2005-022457 | 1/2005 |
| JP | 2005-354759 | 12/2005 |
| JP | 2006-113736 | 4/2006 |
| WO | 0137392 | 5/2001 |

OTHER PUBLICATIONS

"Technical Manual—RTS Automatic Transfer Switch", 27 pages, undated.

(Continued)

*Primary Examiner* — Daniel Cavallari
(74) *Attorney, Agent, or Firm* — Boyle Fredrickson, S.C.

(57) ABSTRACT

A wireless annunciator for an electrical generator displays data regarding operation of the electrical generator to provide feedback to a remote observer regarding performance of the electrical generator in meeting the demands placed thereon. The wireless annunciator wirelessly receives transmissions from one or more wireless modules and displays information based on the data contained in the transmissions. The wireless modules may be associated with sensors, for example, that measure various performance parameters of the electrical generator, such as current draw, fuel level, fuel pressure, and the like. A load management controller can communicate with one or more load-side modules, either wirelessly or across wired links, to control operation of one or more loads to avoid overloading of the electrical generator.

17 Claims, 4 Drawing Sheets

(56) References Cited

U.S. PATENT DOCUMENTS

| | | |
|---|---|---|
| 6,230,496 B1 | 5/2001 | Hofmann et al. |
| 6,510,369 B1 | 1/2003 | Lacy |
| 6,891,478 B2 | 5/2005 | Gardner |
| 7,072,801 B2 * | 7/2006 | James .......................... 702/188 |
| 7,356,384 B2 | 4/2008 | Gull et al. |
| 7,460,348 B2 | 12/2008 | Filippenko |
| 7,509,221 B2 | 3/2009 | Folken |
| 8,103,389 B2 * | 1/2012 | Golden et al. ................ 700/295 |
| 8,324,755 B2 | 12/2012 | Stair |
| 2005/0194456 A1 | 9/2005 | Tessier |
| 2005/0216131 A1 | 9/2005 | Sodemann et al. |
| 2007/0222295 A1 | 9/2007 | Wareham et al. |
| 2008/0185451 A1 | 8/2008 | Simon |
| 2009/0240377 A1 * | 9/2009 | Batzler et al. ................ 700/287 |

OTHER PUBLICATIONS

"Instruction Manual—Nexus Remote Monitor", Generac Power Systems, Inc., P.O. Box 8, Waukesha, WI 53187, Revision A, Jul. 23, 2010, 12 pages.

"Instruction Manual—Wireless Display System", Generac Power Systems, Inc., P.O. Box 8, Waukesha, WI 53187, Revision A, Jun. 28, 2010, 16 pages.

StatStation Installation and Operator's Manual, Jan. 29, 2007, Rheem Sales Company, US.

* cited by examiner

WIRELESS ANNUNCIATOR FOR AN ELECTRICAL GENERATOR

CROSS-REFERENCE TO RELATED APPLICATION

This application claims the benefit of U.S. Ser. No. 61/295,964, filed Jan. 18, 2010.

BACKGROUND AND SUMMARY OF THE INVENTION

The present invention relates generally to electrical generators and, more particularly, to a method and system for remotely monitoring and controlling a backup or emergency power supply system in which one or more electrical generator supply electrical power to an electrical system during interruption of utility or primary power.

Electrical generators are commonly used to provide emergency or backup electrical power to an electrical system when utility power is unavailable. Electrical generators are commonly used to provide backup electrical power for office buildings, medical and nursing centers, hospitals, malls and shopping centers, airports, apartment complexes. These types of facilities will typically require multiple electrical generators to supply the required amount of electrical power to power critical loads, such as HVAC systems, emergency lighting systems, security systems, communication systems, medical equipment, etc.

In some instances the multiple electrical generators are unable to meet the electrical demand. Accordingly, load management systems have been developed to electrically isolate electrical loads from the electrical generators. Various load management systems have been developed including some that acquire current usage data from the loads during normal operation and use that data to terminate electrical power to selected loads based on the total power draw on the electrical generators. One of the drawbacks of these power management or load control systems is that the lack of flexibility. That is, conventional load management systems are only operative during overload conditions and provide limited information regarding operation of the electrical generators, i.e., current draw on the generators.

The present invention is directed to a wireless annunciator for an electrical generator or backup power supply system that displays data regarding operation of the electrical generator to provide feedback to a remote observer regarding performance of the electrical generator in meeting the demands placed thereon. The wireless annunciator wirelessly receives transmissions from one or more wireless modules and displays information based on the data contained in the transmissions. The wireless modules may be associated with sensors, for example, that measure various performance parameters of the electrical generator, such as current draw, fuel level, fuel pressure, and the like. A load management controller can communicate with one or more load-side modules, either wirelessly or across wired links, to control operation of one or more loads to avoid overloading of the electrical generator.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

The drawings illustrate the best mode presently contemplated of carrying out the invention. In the drawings.

DETAILED DESCRIPTION OF THE INVENTION

Figure 1:
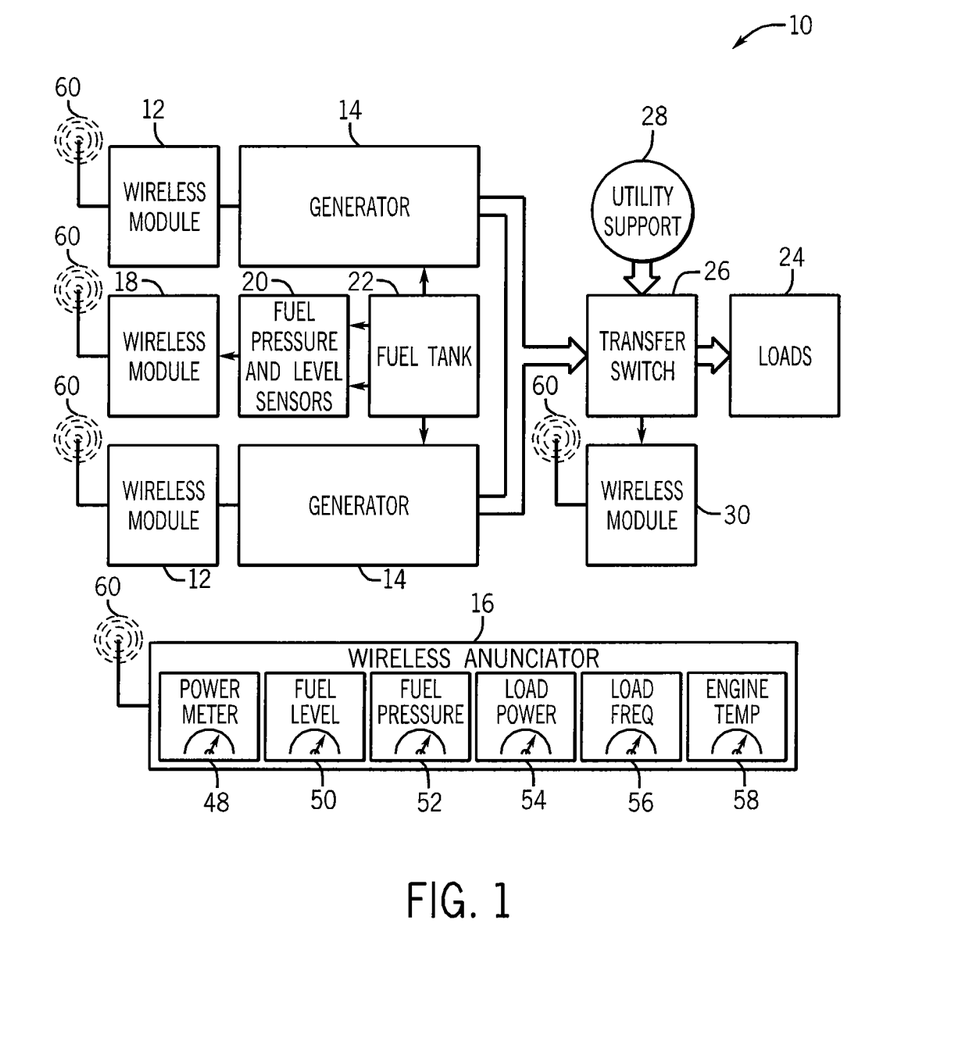
FIG. 1 is a schematic representation of a wireless annunciator system according to one aspect of the invention.

Turning now to FIG. 1, in one embodiment, the invention is directed to a wireless annunciator system 10 in which one or more wireless modules 12 are used to wirelessly transmit operational information regarding one or more electrical generators 14 to a dashboard 16 or similar graphical interface to allow a user to remotely monitor, and in some instances, modify operation of the one or more electrical generators. In addition to wireless modules 12 for the one or more electrical generators, the annunciator system 10 preferably includes wireless modules for other systems associated with the electrical generator, such as a wireless module 18 for fuel pressure and level sensors 20 of a fuel tank 22 that contains fuel (not shown) for the internal combustion engines (not shown) of the one or more electrical generators 14. In the illustrated system, a single fuel tank is used to supply fuel for multiple electrical generators but it is understood that multiple fuel tanks could be used including a dedicated fuel tank for each electrical generator. Thus, it is further considered that multiple fuel pressure and level sensors may be required to monitor fuel and pressure levels in the multiple fuel tanks. In such an embodiment, it is contemplated that one or more ancillary wireless modules 18 may be used to wirelessly provide information to the wireless annunciator dashboard 16.

Still referring to FIG. 1, the electrical generators 14 provide backup or emergency power to an electrical system 24 through a transfer switch 26 when utility power 28 to the electrical system ("loads") is unavailable. In a preferred embodiment of the invention, the wireless annunciator system 10 includes a wireless module 30 that provides information regarding operation of the transfer switch 26 to the dashboard 16. For example, the transfer switch 26 may include current and/or voltage sensors (not shown) or a frequency sensor and the wireless module 30 could transmit current and/or voltage and other information regarding the power draw by the loads 24 to the dashboard 16.

It will be appreciated that each wireless module has circuitry (not shown) that allows the transmission and/or reception of data. It will be further appreciated that the modules can be configured with different interface options including digital I/O, analog inputs, and serial interfaces. Digital and analog inputs can be used for sensor inputs, switch inputs, and communication with a controller. The digital outputs can be used to activate display lights, text, relays, or run a buzzer, for example. The serial interface can be used to communicate with a generator controller or other microprocessor based systems. The system could also be setup to communicate with a cell phone, personal data assistant, computer, or other remote device to allow remote monitoring and control.

A wireless module may be paired with, or include, a user interface, e.g., dashboard 16, for the conveyance of information to a user regarding operation of the generator, such as fuel level. It is also contemplated that wireless modules could be associated with loads that are powered by the generator during utility power interruption or a transfer switch to control operation of the generator to meet the demands of a load network, e.g., home.

Figure 2:
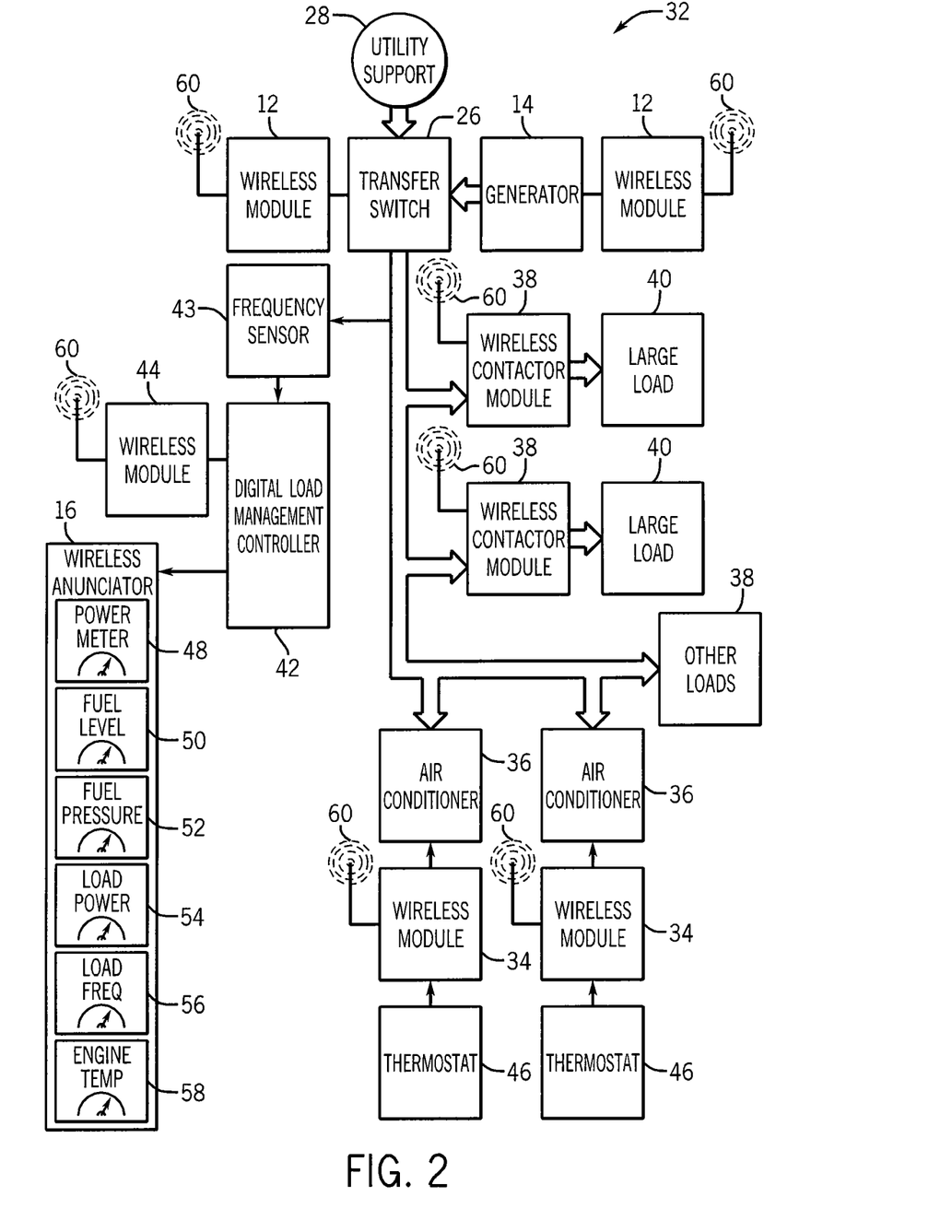
FIG. 2 is a schematic representation of a wireless load management system according to another aspect of the invention.

For example, and turning now to FIG. 2, the wireless anunicator system described with respect to FIG. 1 may be incorporated with a wireless load management system 32 in which wireless modules 34 are used to wirelessly provide operational and/or performance information regarding high current draw appliances, such as air conditioners 36 and normal or light current draw loads 38. Additionally, it is contemplated that the wireless management system may include wireless contactor modules 38 that control the flow of electrical current either from a generator 14 or a utility power supply 28 to dedicated high current draw devices ("large loads" 40). In this regard, the wireless contactor modules 38 are capable of providing a switching function to selectively connect/disconnect the large loads 40 to either the generator 14 or the utility 28 based on command signals wirelessly transmitted thereto, such as from a load management controller 42 (via wireless module 44). Frequency information regarding the flow of electrical current to the various loads may be sensed by a frequency sensor 43 to provide information regarding the quality of electrical power being provided by the electrical generator 14 or the utility supply 28.

Wireless module 44 is communicatively linked with the load management controller 42 and is capable of receiving wireless transmissions from wireless modules 12 and 34 and wireless contactor modules 38. Moreover, the wireless module 44 is capable of transmitting information, such as commands, to the wireless modules to effectuate changes in operations of the transfer switch 26, generator 14, dedicated appliances, e.g., AC units 36, and large loads 40.

For example, wireless modules 34 may receive information from thermostats 46 for the AC units 36 and convey that information to wireless module 44 which is then communicated to the load management controller 42. Based on the demands being placed on the generator 14, for example, the load management controller 42 may construct a message that is transmitted to wireless module 34 via wireless module 44. Upon receipt of the electronic message, the wireless modules 34 may then change a setting of the thermostat, such as to delay or accelerate operation the AC units, i.e., raise or lower the temperature setting of the thermostats 46. In this regard, rather than turning on or shutting down of the AC units 36 automatically, the controller 42 can control operation of the AC units by changing the settings of the thermostats 46 to manage the power draw on the generator 14. It will therefore be appreciated that the controller 42 can control operation of the loads, via communication with the wireless modules, to limit the power draw on the generator 14. This is believed to be particularly advantageous in reducing the size of the generator 14 needed for a given electrical system. Reducing the size of the generator 14 not only can lead to reduction in purchasing and operating costs but can also provide a desirable reduction in noise emissions, which is a growing concern of municipalities, homeowners' associations, and condominium managers.

Referring briefly again to FIG. 1, it is contemplated that the graphical dashboard 16 could take one of many forms and could be configured to display information in one or more forms. In one example, the dashboard 16 includes a power meter 48, fuel level gauge 50, fuel pressure gauge 52, load power meter 54, load frequency 56, and engine temperature gauge 58. It is contemplated that the dashboard 16 may include one or more toggle buttons (not shown) to toggle the display information between various menus. Alternately, the menus could be toggled automatically. The dashboard 16 may be displayed on any device or monitor capable of electronically displaying information, such as a computer screen or the display of a mobile phone or personal data assistant.

As shown in FIGS. 1 and 2, the various wireless modules and the dashboard 16 are equipped with antennas 60 to facilitate the transmission and reception of data in a manner that is known. Various types of known antennas may be used.

Figure 3:
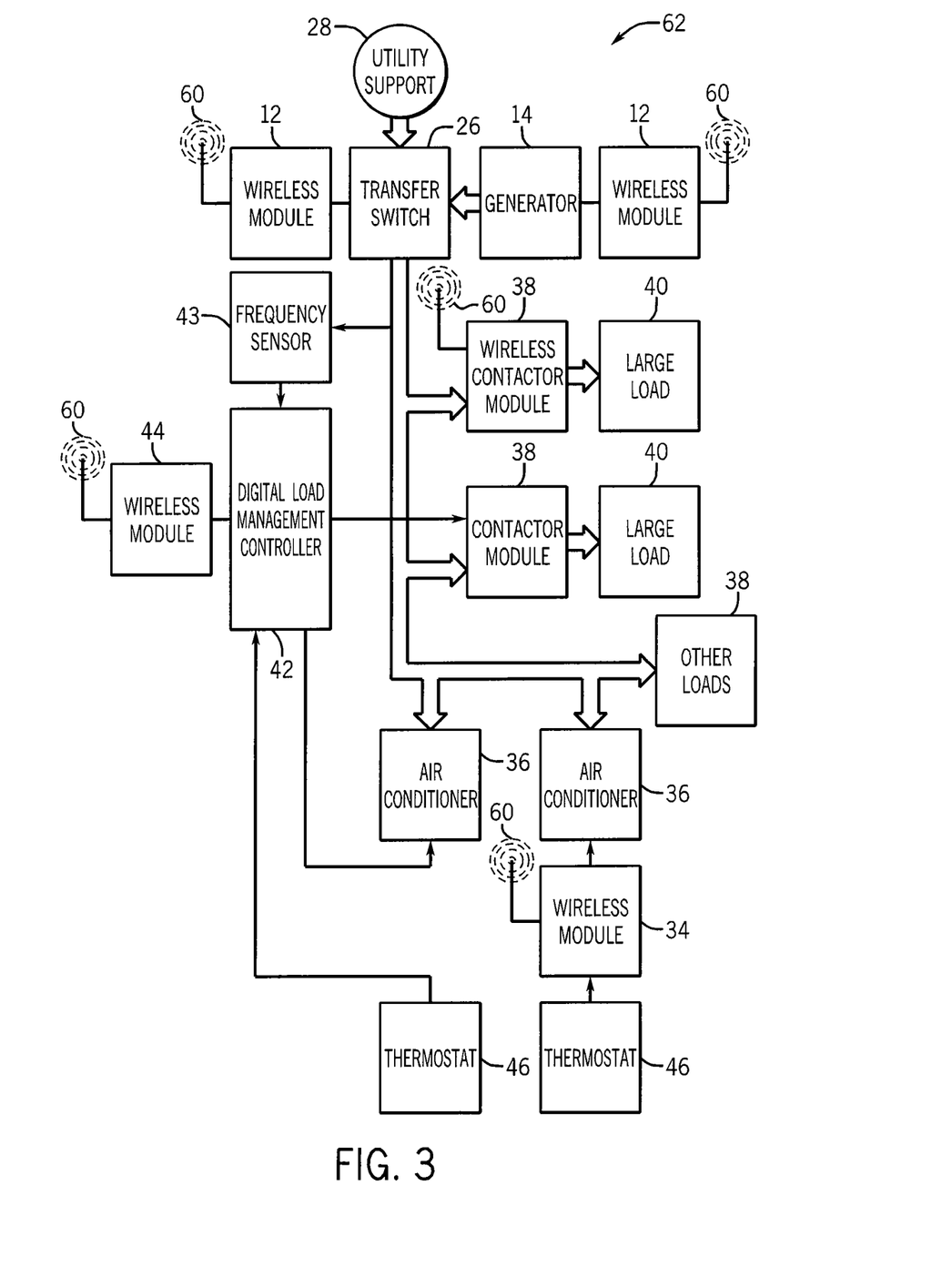
FIG. 3 is a schematic representation of a hybrid wired and wireless load management system according to a further aspect of the invention.

Turning now to FIG. 3, it is contemplated that the present invention may be implemented with a hybrid load management system in which wireless and traditional wired connections are used to provide performance information to the load management controller 42. In the hybrid arrangement 62 illustrated in FIG. 3, one of each type of load, e.g., one AC unit 36, one thermostat 46, and one large load 40, is wired to the load management controller 42. The other loads are associated with a wireless module as described above and communicate with wireless module 44 to transmit data to and receive commands from the load management controller 42.

Figure 4:
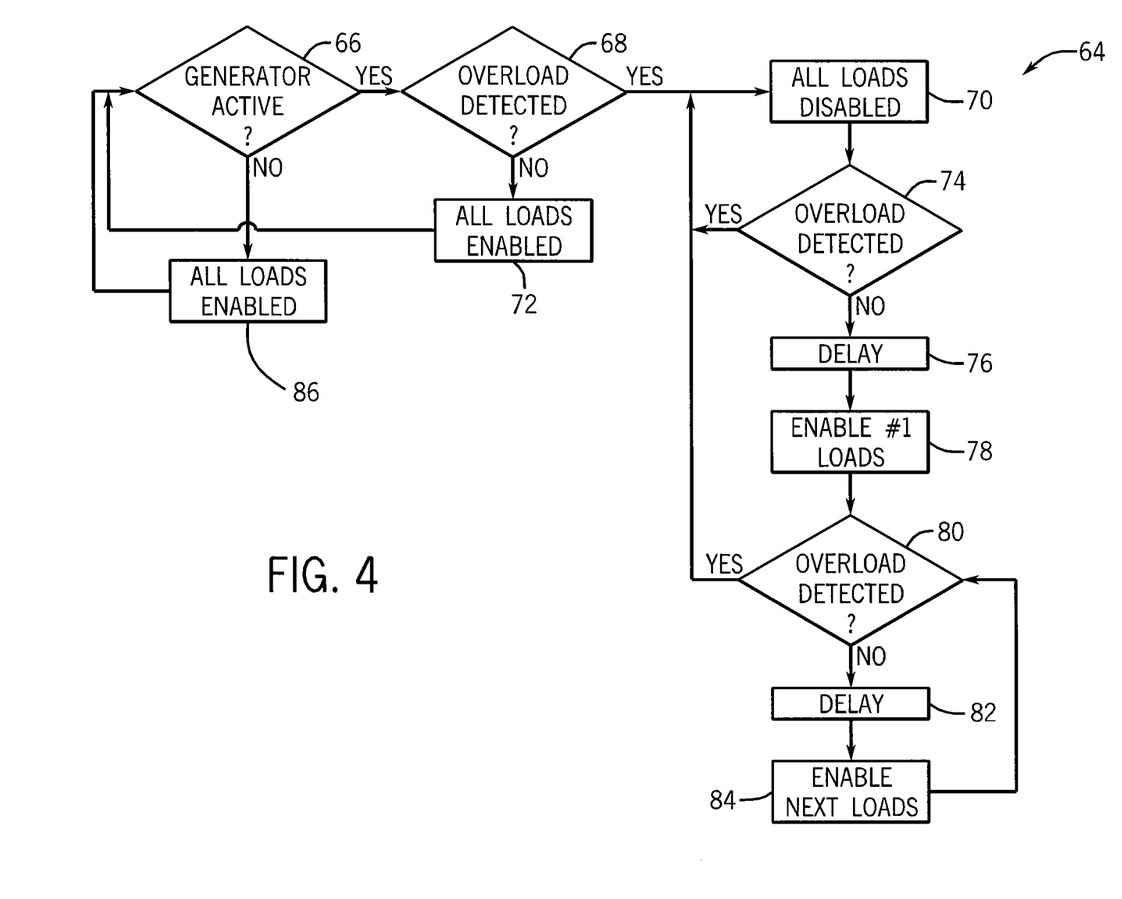
FIG. 4 is a flow chart illustrating a load management process.

It is contemplated that the controller 42 could execute one of a number of load management programs to control the loading on the generator(s) when backup power is being provided to the loads of the electrical system. For example, according to one exemplary program, the steps of which are illustrated in the flow chart 64, each of the loads is classified based on its current draw. In this regard, the controller, after determining that the generator(s) is providing electrical power to the electrical system at block 66, determines if the electrical system is overloading the generator(s) at block 68. If so, all loads are disabled at block 70. This can be done by transmitting command signals to the wireless modules and contactor modules (and wired counterparts in a fully wired or hybrid load management system) instructing the modules to electrically isolate their loads from the generator(s) 14, such as by opening a corresponding contactor, switch, or adjusting a setting on a thermostat, for example. If an overload is not detected, all loads on the generator(s) are left enabled at block 72 and the process loops back to block 66 and repeats the steps described above.

However, if an overload is detected at block 68, the loads are disabled at block 70 as noted above. As the loads are disabled, the controller iteratively determines if the generator(s) is overloaded at block 74. It is contemplated that the controller can stagger the disabling of the loads and capture data during the disabling process that the controller can then use when loads are reenabled. That is, the current draw on the generator(s), for example, can be read as the loads are sequentially disabled to determine the current draw each load is placing on the generator. Once each of the loads has been disabled, i.e., electrically isolated from the electrical generator(s), the controller observes a predefined delay period at block 76 to allow the output of the generator(s) to stabilize. After the delay, the controller then instructs the wireless modules and wireless contactor modules to "re-enable" the disabled loads. In a preferred embodiment, each load is classified and grouped. In this regard, after the delay is observed, the first group of loads is re-enabled.

The loads can be grouped in a number of ways. For example, the loads may be grouped based on criticality, i.e., importance of the load. Medical equipment, for instance, may be deemed the most important for a given electrical system and thus placed into the first group whereas audio/video appliances may be less important and grouped accordingly.

The loads could also be grouped based on current draw, or expected current draw, so that the loads that require the most current are enabled before other loads. Additional information, such as expected use during utility power outage, could be used to classify or group the loads. For example, the controller could take a reading of the thermostats for the AC units and compare that data to ambient temperature information and determine that the AC units will not be required for an extended period. Thus, while the AC units may otherwise be in the first group that is enabled, the controller may change the grouping of the AC units based on their reevaluated importance level.

After the first group of loads is enabled at block 78, the controller again determines if the generator(s) is being overloaded at block 80. If not, another delay is observed at block 82 and the next group of loads is enabled at block 84. Thereafter, the process loops back to block 80 until each of the loads has been enabled or an overload condition has been detected.

If an overload condition is detected at block 80, the process returns to block 70 and repeats the steps described above. In one embodiment, if an overload condition is detected subsequent to a group of loads being enabled, the controller, when re-enabling the loads of that group, enables the loads one at a time based on a priority level for each load.

Once utility power is restored and the generator is deactivated, as determined at block 66, the controller re-enables all loads at block 86. The enabling of the loads upon restoration of utility power can be done simultaneously or in sequenced/staggered manner.

It will be appreciated that the wireless modules described above can have application specific code running on them without affecting the transmission of data. This allows simple tasks to be done without the need for a separate processing unit or circuitry. The load management system can be configured with different message sizes and update rates that provide the flexibility needed to reduce current consumption for battery powered applications.

Multiple wireless modules can be paired together. Pairing allows the modules to know what other modules it should communicate with. Several different modules can be paired to a single generator. This allows a generator to simultaneously have external sensors, a remote user interface, and any other available wireless features.

In describing the load management systems of FIGS. 2 and 3, representative uses for the various wireless modules have been described. It is understood however that the wireless modules could be used to transmit or receive data different from that described herein. For example, a wireless module could be used for or with:

Remote status monitor, e.g., dashboard 16
Remote interface that allows remote user control
Digital remote fuel monitor
Analog remote fuel monitor
Load management and load profile
Wireless load shed
Wireless air conditioner interrupter
Wireless transfer switch—transfer signal
Overload indicator
Battery voltage monitor
Communication between generators
Remote generator start/stop
Remote power bar (generator load indicator)
Sensors for generator
  Temperature
  Pressure
  Humidity
  Wind speed/direction
  Fuel Pressure
  Fuel Quantity
  Engine Speed
  Demand
  Voltage
  Frequency
  Accelerometer
  Utility Sense
  Toxic Emissions, e.g., carbon monoxide nitrous oxide, gas vapor, etc
  Water sensor for house flood detection The wireless communication system of the present invention may also be used with smart load management systems that intelligently manage large loads allowing a smaller generator to meet the demands that heretofore have required larger generators.

As apparent from the foregoing description, the system of the present invention can be used to manage various types of loads. For example, air conditioners typically place a large load on an electrical generator and are often one of the largest loads of a home electrical system. The wireless modules together with command signals received from a load management controller can control operation of thermostats for the AC units to interrupt the signals in the thermostat control wires to effectively disable the AC units.

Other types of loads can be similarly managed. That is, the wireless module for a given load receives wireless commands from the wireless module of the generator or load management controller and when it is desired or needed to terminate the current draw of the load, a wireless signal is transmitted to the wireless module for the load instructing the module to shut-down operation of the load. Alternately, power to the load is run through a contactor module and in the event of an overload or other condition in which it is desired, the module cuts off power to the load.

The system can manage multiple numbers of each type of load. The loads can be set into priority levels that determine when they are enabled after an overload. After the overload has subsided, loads may be enabled sequentially one at a time. If an overload occurs again all loads are shed. If an overload occurs shortly after adding a load, that load is assumed to be the one that is overloading the system and is locked out for a set amount of time. The other loads are allowed to run. A signal can then be provided to the wireless module for the locked out load identifying the load as being locked out. That information can then be communicated to the controller so that corresponding information can be displayed on the dashboard or otherwise communicated to a user, such as through a text or email message.

It is also contemplated that the present invention may also be used with a wired load management system in which a load management controller wirelessly transmits performance and operational data to a remote user interface, such as dashboard 16, to enable a user to remotely monitor, and control, the load management system and the components therein. For example, if the fuel level of a generator is running low, whether it be part of a wireless, hybrid, or wired system, the user could periodically disable the generator or slow it down to conserve fuel based on an expected downtime of utility power and/or until the fuel source can be replenished.

Many changes and modifications could be made to the invention without departing from the spirit thereof. The scope of these changes will become apparent from the appended claims.

The invention claimed is:
1. A power system comprising:
an electrical generator that converts mechanical energy to electrical current for powering loads of an electrical system during utility power interruption;

a wireless communication system that includes a wireless annunciator and facilitates the wireless transmission of data between the electrical generator and the wireless annunciator;
   a first sensor sensing an operational characteristic of the electrical generator and a first wireless module operatively connected to the first sensor, wherein the first wireless module is configured to transmit data relating to the electrical generator to the wireless annunciator;
   a second sensor sensing an operational characteristic of the electrical system and a second wireless module operatively connected to the second sensor, wherein the second wireless module is configured to transmit data relating to the electrical system to the wireless annunciator; and
wherein the wireless annunciator receives data transmitted from the first and second wireless modules and is configured to convey information relating to the operational characteristics of the electrical generator and the electrical system to a user by displaying the information relating to the operational characteristics of the electrical generator and the electrical system at the wireless annunciator.

2. The power system of claim 1 wherein a graphical user interface of the wireless annunciator is configured to display information regarding the operational characteristics of at least one of the electrical generator and the electrical system.

3. The power system of claim 1 wherein the first sensor is defined by a fuel level sensor that measures fuel level of a fuel source that provides fuel to the electrical generator.

4. The power system of claim 1 wherein the first sensor is defined by fuel pressure sensor that measures pressure in a fuel line along which fuel is supplied from a fuel source to the electrical generator.

5. The power system of claim 1 further comprising a load control module capable of wirelessly receiving information from at least one of the first and second wireless modules, the load control module configured to electrically isolate at least one of the loads of the electrical system from the electrical generator when instructed to do so.

6. The power system of claim 5 further comprising a load management controller connected to at least one of the first and second wireless modules, and configured to control operation of the electrical generator or the load control module.

7. A power management system for a plurality of loads that are supplied power by an electrical generator during interruption of a primary power supply that normally supplies power to the plurality of loads, the system comprising:
   a controller that monitors data relating to the plurality of loads and the electrical generator and is configured to determine if the electrical generator can meet the demands of the loads being supplied power by the electrical generator; and
   a wireless annunciator operatively connected to the controller and configured to convey information relating to the electrical generator and the plurality of loads to a user by displaying the information relating to the electrical generator and the plurality of loads at the wireless annunciator,
   a first module wirelessly coupled to the controller and to the wireless annunciator for transmitting data relating to an operational characteristic of the electrical generator;
   a second module wirelessly coupled to the controller and to the wireless annunciator for transmitting data relating to an operational characteristic of the plurality of loads; and
wherein the controller is configured to receive and evaluate data transmitted from at least one of the first and second modules and electrically isolate at least one of the plurality of loads from the electrical generator based on the data transmitted from at least one of the first and second modules and evaluated by the controller to reduce loading of the electrical generator.

8. The power management system of claim 7 further comprising one or more sensors that measure performance of the electrical generator and one or more sensor modules communicatively linked with the one or more sensors to wirelessly transmit data regarding performance of the electrical generator to the controller.

9. The power management system of claim 8 wherein a graphical interface of the wireless annunciator remote from the electrical generator displays information regarding operation of at least the electrical generator.

10. The power management system of claim 9 wherein the graphical interface is configured to display information corresponding to performance measured by the one or more sensor modules.

11. The power management system of claim 7 further comprising a contactor communicatively linked with the module and operative to interrupt current flow to the load when instructed by the controller.

12. The power management system of claim 7 wherein the load includes an AC unit operatively associated with a thermostat, and wherein the module is coupled to the thermostat and operative to change a setting of the thermostat when instructed by the controller.

13. A backup power supply system that supplies electrical power to an electrical system during interruption of utility power to the electrical system, the power management system comprising:
   a load management controller;
   an electrical generator remote from the load management controller for powering a load of an electrical system during interruption of utility power to the electrical system;
   a wireless annunciator connected to the load management controller and configured to convey information relating to the electrical generator and the electrical system to a user by displaying the information relating to the electrical generator and the electrical system at the wireless annunciator;
   a transfer switch that selectively connects the electrical system to the electrical generator during interruption of utility power;
   a first wireless module associated with the electrical generator to transmit data relating to the electrical generator to the wireless annunciator;
   a second wireless module associated with the load of the electrical system to transmit data relating to the electrical system to the wireless annunciator and operative to wirelessly receive instructions from the controller and, when instructed by the controller, change a current draw of the load on the electrical generator.

14. The backup power supply system of claim 13 further comprising a switching device connected between the load and the electrical generator, and wherein the wireless module is further operative to control the switching device to electrically isolate the load from the electrical generator when instructed by the controller to do so.

15. The backup power supply system of claim 13 wherein the load includes an AC unit, and further comprising a thermostat that controls operation of the AC unit, and wherein the wireless module is configured to change a setting of the thermostat when instructed by the controller.

16. The backup power supply system of claim 13 wherein a graphical user interface of the wireless annunciator is communicatively linked with the controller and operative to display information regarding performance of the electrical generator in supplying electrical power to the electrical system.

17. The backup power supply system of claim 16 further comprising one or more sensors that measure performance of the backup power supply system and one or more wireless modules that wirelessly transmit data regarding the performance of the backup power supply to the controller.

* * * * *